June 10, 1952     G. WALLIS     2,599,958
FIRE HOSE SAMSON
Filed June 17, 1946
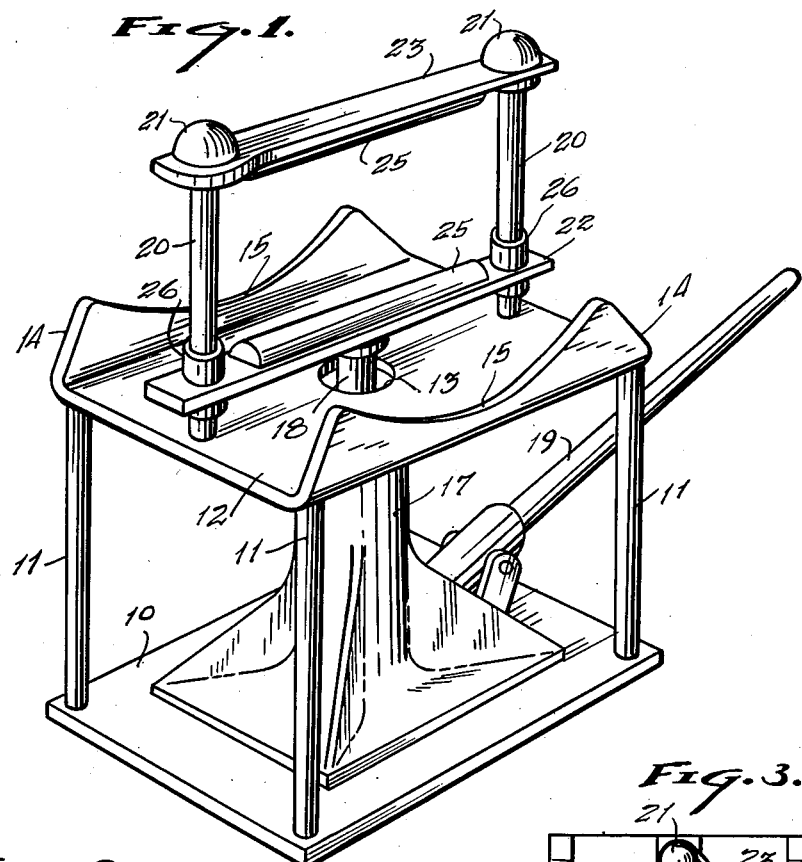
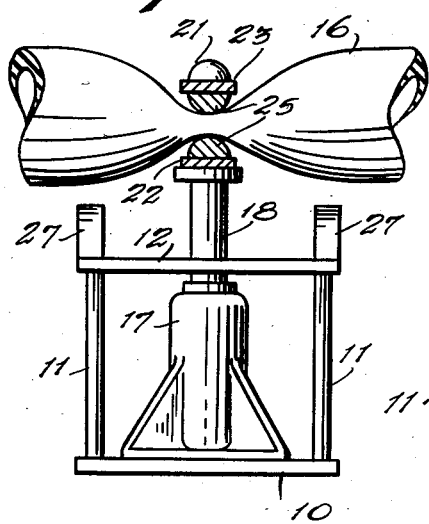
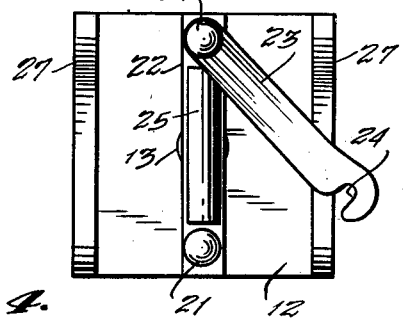
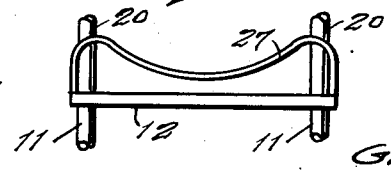
GROVER WALLIS
INVENTOR.
BY
ATTORNEY Patented June 10, 1952

2,599,958

UNITED STATES PATENT OFFICE 2,599,958

FIRE HOSE SAMSON

Grover Wallis, Fort Worth, Tex., assignor of one-half to George Miles, Fort Worth, Tex.

Application June 17, 1946, Serial No. 677,242

5 Claims. (Cl. 251—5)

This invention relates to clamping devices for hose, or the like, such as fire hose, and it has particular reference to apparatus generally referred to as a samson utilized by firemen for shutting lines of fire hose in emergencies, such as a break in the line, or the like, under high pressures, and its principal object resides in a simple and effective hydraulic mechanism capable of manual operation whereby extremely high line pressures can be shut off with relative ease by an individual.

Another object of the invention resides in the provision of a clamping device for flexible water lines which is adapted for use in any situation requiring the shutting off of a water supply where the use of a valve is not practical or expedient, as when relatively long lines of fire hose are strung for fire-fighting and a break or rupture occurs in a line remote from a valve and it becomes expedient to shut off the water supply.

An object of the invention is that of affording a light, durable and effective structure, capable of exerting great pressure to "pinch" a large water hose under high fluid pressures and function as a valve to interrupt the flow of fluid through the line.

Broadly, the invention seeks to comprehend the provision of a hose clamp, especially adapted for use with fire hose, which requires a minimum of effort and time to operate and, due to its compact structure, is capable of easy handling and storage.

While the foregoing objects are paramount, other and lesser objects will become manifest as the description proceeds, taken in connection with the appended drawings wherein:

Figure 1 is a perspective illustration of the invention showing the centering flanges for the hose and the hose engaging boss.

Figure 2 is an end elevational view of the invention, fragmentarily illustrating a length of hose engaged by the clamping boss, the latter being shown in transverse section.

Figure 3 is a plan view of the invention showing the latchable hinged hose retaining bar in unlatched position, and Figure 4 fragmentarily shows a modified form of hose supporting or centering device.

The invention contemplates a simple structure utilizing light, although durable materials, and it comprises a base plate 10 preferably rectangular in form and having a plurality of posts or standards 11 arranged thereon, one of which is situated at each corner, and which support a table or hose supporting plate 12 spaced above the base plate 10.

The plate 12 has an aperture 13 centrally thereof and has its longer edges turned upwardly, at right angles to its normally horizontal surface, providing flanges 14 whose edges 15 are curved downwardly forming centering rests for a hose 16 when the latter is arranged across the table or plate 12 and before pressure is applied thereto.

A hydraulic jack 17, which is generally of the conventional design is rigidly secured to and supported on the base plate 10, its ram or plunger 18 projecting through the aperture 13 in the plate 12 and capable of operating therethrough. A handle 19 is provided for the operation of the jack 17 in the usual manner.

At each end of the plate 12 is arranged a guide rod 20, both of which are rigidly attached and project upwardly intermediate the flanges 14. A head 21 is formed integral with each rod 20. A hose engaging bar 22 is arranged between the rods 20 and has a sliding connection therewith at each end so that the bar 22 is capable of moving upwardly and downwardly in a horizontal position when actuated by the plunger 18 of the jack 17, the bar 22 having an integral or rigid association with the top of the plunger 18 above the plate 12.

A companion bar 23 is arranged above the bar 22 and hinged at one end to the top of one of the guide rods 20 just beneath the head 21 thereof so that it will pivot or swing horizontally in the manner shown in Figure 3. Its opposite end is formed with a notch 24 which engages the opposite rod 20 beneath its head 21 and is secured against upward movement. Both of the bars 22 and 23 have their corresponding surfaces 25 rounded so as not to present any sharp or angular edges to the hose 16 when the latter is engaged thereby, as in Figure 2.

In operation, the invention is placed on the ground near the hose 16 and the upper or latch bar 23 is swung around, in the manner shown in Figure 3, so that the hose 16 can be arranged across the supporting flanges 14. The latch bar 23 is returned to locked position parallel to the bar 22, the hose being centered by the curved edges 15 of the flanges 14, and the jack 17 is manipulated to raise the bar 22 against the hose 16 which is urged upwardly against the bar 23 and being restrained thereby, is pinched or clamped, in the manner illustrated in Figure 2, until the fluid flow therethrough is shut off.

Fire hose is frequently used under relatively high pressures ranging sometimes around 150 pounds, or more, and under such conditions the hose becomes very rigid and difficult to pinch or crimp. The invention is thoroughly capable of accomplishing this, due to its hydraulic power. The conventional devices employed for a similar purpose are difficult to manage and often fail to perform under conditions where high fluid pressures are employed.

The bar 22 may, if desired, have a vertical sleeve 26 rigidly fixed to each end to provide bearings on the guide rods 20, as illustrated in Figure 1, although it is contemplated that the bar 22 be rigidly secured to the plunger 18 and therefore incapable of any distorted movement to impair its function. The supporting brackets 27, of the structure shown in Figures 2, 3 and 4, which are formed from metal straps and attached to the plate 12, may be substituted for the flanges 14.

Although the invention has been described with great particularity, it is obvious that certain changes and modifications may be resorted to by persons skilled in the art without departing from the spirit and intent of the invention, or the scope of the appended claims.

I claim:

1. In a samson for shutting off water pressure in a fire hose, in combination with a manually operated hydraulic plunger mechanism, a base supporting said mechanism and, a stationary hose rest arranged above said base and rigidly supported above said mechanism on standards rising from said base, a pair of spaced guide rods arranged at each end of said rest having a hose engaging bar slidably connected therebetween and engageable with the upper end of said plunger to be moved thereby, and a hose engaging latch member hinged to the top of one of said guide rods and latchable to the other for holding said hose against the pressure of said engaging bar and plunger.

2. In a hose samson for fire hose, in combination, a base plate having a hydraulic jack with a ram rigidly supported thereon, a stationary hose supporting plate spaced above said base and said jack by vertical standards on said base having a hose rest flange arranged on each side thereof, a pair of spaced vertical guide rods rigidly attached to said plate, a horizontally arranged hose engaging bar slidably connected between said guide rods and having rigid association with the upper end of said ram and capable of being raised thereby, and a latch bar hingedly connected to the upper end of one of said guide rods and latchable to the other restraining said hose under pressure of said engaging bar and ram.

3. In a hose samson, or the like, in combination with a hose having a manually operated hydraulic jack mechanism rigidly supported thereon, the said jack having a vertical ram, a hose supporting plate spaced above said base and rigidly supported by a plurality of standards, the said ram operating through an aperture in said plate, a pair of spaced vertical guide rods rigidly arranged on said supporting plate on each side of said ram, a hose engaging bar arranged transversely on the upper end of said ram and having slidable securement at each end to said guide rods, and a hose restraining bar hingedly and latchably connected between the upper ends of said guide rods.

4. In a hose samson for fire hose, or the like, in combination with a base member having a hydraulic jack assembly rigidly supported thereon, said jack assembly having a vertically operative ram, a hose supporting plate arranged above said base member and having an aperture therein in which said ram is movable, a pair of spaced guide rods vertically arranged on said supporting plate, a hose clamping bar arranged transversely of the upper end of said ram and slidably connected to said guide rods at each end, and a hose restraining bar hingedly and latchably arranged between the upper ends of said guide rods capable of holding said hose against the pressure applied through said ram and hose clamping bar.

5. In a hose clamp for fire hose, or the like, in combination with a base plate having a hydraulic jack mechanism rigidly supported thereon, a plunger in said mechanism operating vertically, a hose supporting plate having a central aperture through which said plunger is movable, hose centering flanges on said hose supporting plate, a pair of vertical guide rods on said hose supporting plate, a hose engaging bar arranged transversely of and secured to the upper end of said plunger and capable of being operated thereby along said guide rods, a rigid transverse bar spaced above said engaging bar and hingedly and latchably connected between said guide rods at their upper ends.

GROVER WALLIS.

REFERENCES CITED

The following references are of record in the file of this patent:

UNITED STATES PATENTS

| Number | Name | Date |
| --- | --- | --- |
| 1,968,454 | Hyatt | July 31, 1934 |
| 2,098,548 | Kick | Nov. 9, 1937 |
| 2,150,262 | Brittain | Mar. 14, 1939 |
| 2,167,952 | Jordan | Aug. 1, 1939 |